Sept. 19, 1933.     J. PETRY     1,927,416
CAGE
Filed Feb. 4, 1932
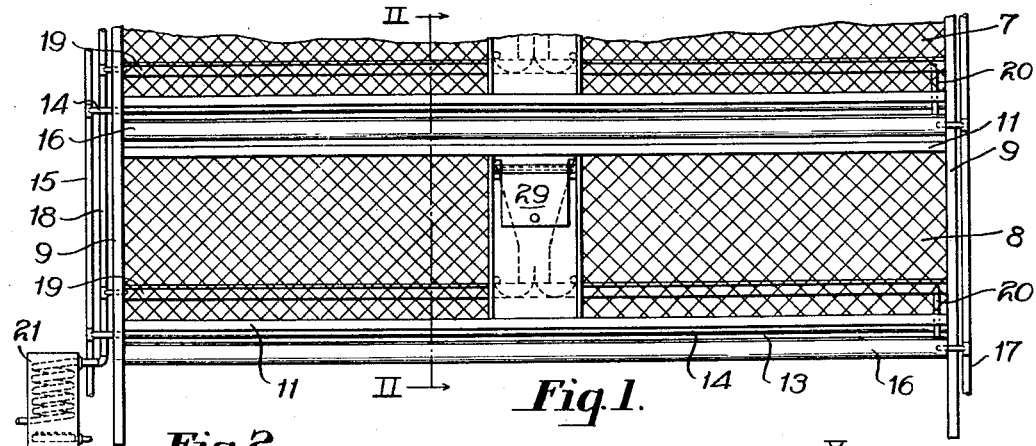
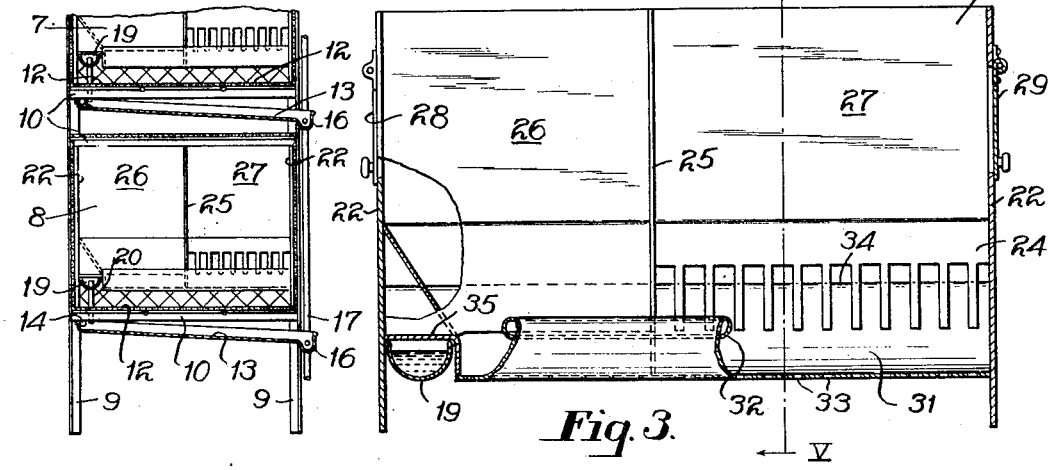
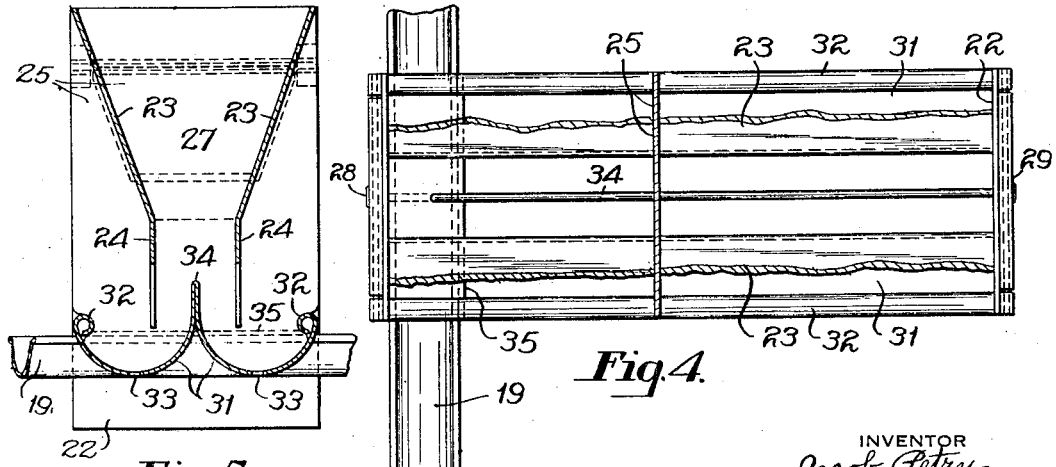
INVENTOR
Jacob Petry,
By Archworth Martin,
Attorney Patented Sept. 19, 1933

1,927,416

UNITED STATES PATENT OFFICE 1,927,416

CAGE

Jacob Petry, Pittsburgh, Pa.

Application February 4, 1932. Serial No. 590,794

3 Claims. (Cl. 119—17)

My invention relates to cages and the like, and is hereinafter described more particularly as employed in connection with rabbit hutches.

One object of my invention is to provide a rabbit hutch or the like that may be more conveniently kept in a sanitary condition than various types of cages or hutches heretofore employed.

Another object of my invention is to provide an improved form of feed receptacles for the hutches.

Other objects of my invention are, to provide an improved manner of supplying constantly-flowing drinking water to the animals, thereby avoiding the accumulation of filth, such as occurs in ordinary drinking receptacles, and saving the labor required to constantly clean and replenish water dishes and the like; to provide a means for feeding the animals in more than one cage, by a single operation; to provide means for preventing waste of feed and reduce danger of its becoming contaminated by foreign matter, and to provide an arrangement of apparatus whereby the animals may be kept under healthful conditions, and with a minimum of attention by attendants.

In the accompanying drawing, Figure 1 is a fragmentary side elevational view of hutches embodying my invention; Fig. 2 is a view taken on the line II—II of Fig. 1; Fig. 3 is a sectional view, on an enlarged scale, of the feed receptacle of Fig. 2; Fig. 4 is a plan view of the structure of Fig. 3, partly in section and Fig. 5 is a view taken on the line V—V of Fig. 3.

In structures of this kind, the cage units are commonly placed in superposed relation or tiers, two or three high, for the purpose of economizing in space. I have indicated two cage units by the numerals 7 and 8, respectively, but since they are of substantially duplicate construction, I will describe only the unit 8.

Each cage unit consists of a framework comprising end members or posts 9 connected by cross bars 10 and longitudinally-extending bars 11. The side and end walls are preferably composed of wire mesh secured to the frame members 9, 10 and 11, and the bottom wall is composed of a mesh sheet 12.

The parts thus far described may be of any suitable well-known form. Beneath the screen bottom 12, I provide a dropping board 13 which may be of sheet metal or other suitable material. This board serves to receive the litter or droppings which fall through the screen 12, and is inclined downwardly toward the front side of the cage. At its rear edge a flushing pipe 14 is mounted, the said pipe being provided with perforations throughout its length, and supplied with water from a suitable source, through a pipe 15. Water is periodically admitted from the pipe 15 to wash the bottom board 13, the water flowing across said board into a gutter 16 at the front lower edge of the bottom board. A drain pipe 17 carries the flushing water away from the gutter 16 to a sewer or to some point where the sediment may be collected for use as fertilizer, with a strainer.

Drinking water for the rabbits is supplied from a pipe 18 to a trough 19 at the rear side of the cage. An overflow pipe 20 is provided at one end of the trough 19, such end being preferably a little lower than the opposite end of the trough, so that water will tend to flow toward the overflow pipe and be constantly replaced in the trough by the admission of fresh water from the pipe 18. The water may be constantly supplied from the pipe 18 at a low rate of flow, to avoid use of excessive quantities of water, but is supplied in sufficient volume to maintain the body of water in the trough 19 in a sanitary condition. The water may pass through a heater coil 21 and may be there warmed somewhat, particularly in the winter time, to prevent freezing of the water in the trough.

Referring now to the feed box or trough, it may be suitably formed of sheet metal and consist of end plates 22 of rectangular form and side plates 23 secured at their ends to the end plates, by welding, riveting, or otherwise. The side plates 23 are inclined toward one another, as shown more clearly in Fig. 5, and at their ends have vertical extensions 24. A partition plate 25 is employed to divide the feed box into compartments 26 and 27; the compartment 26 being for fine feed, and the compartment 27 for hay, or the like. Hinged end doors 28 and 29 are provided to permit the placing of feed in the compartments 26 and 27, respectively.

The extensions 24 of the walls 23 are slotted or have rack-like extensions to serve the purpose of a hay rack, so that the rabbits may gain access to the hay in the compartment 27. Feed troughs 31 are disposed beneath the feed box and are provided with curled edges 32 which prevent the rabbits from scraping the fine feed and hay leaves out of the trough and wasting them on the floor. The partition plate 25 extends into the troughs 31, and divides the same into trough sections, for receiving the feed from the compartments 26—27, respectively.

The troughs 31 have drain holes or perforations 33 in their bottoms so that any moisture which goes into the troughs will drain away and not spoil the feed. The inner edges of the troughs 31 extend upwardly into the feed box as indicated at 34, to serve as a dividing wall or partition. Feed introduced into the feed box will automatically be divided by the partition 34 in substantially equal quantities, so that the rabbits which are fed from one trough 31 will secure a share substantially equal to that which the rabbits will receive at the other trough 31. The troughs 31 at one end are offset somewhat as shown more clearly in Fig. 3, to permit the water trough 19 to be placed at the proper level in the hutch, namely two or three inches above the floor 12, the trough 19 being covered as at 35 in the vicinity of the feed troughs to prevent feed from getting into the water and clogging the trough 19.

The feed box and the troughs 31 are made unitary with the end plates 22, so that they can be conveniently inserted and removed from a cage. The feed box serves as a partition extending transversely of and dividing the cage into two parts, each of which serves the purpose of a cage separate from the other part.

By the feed box arrangement shown in the drawing, the rabbits contained in both compartments of the cage can be fed by the single operation of putting feed into the feed box, since the feed will be automatically divided into proper separate portions by the dividing rib or plate 34.

The end walls 22 may closely fit the side walls of the cage, or may form part of the side walls. In any event, the feed box structure is such that it prevents rabbits from one part of the cage getting through to that section of the cage at the opposite side of the feed box.

I claim as my invention:—

1. The combination with a cage, of a feed box disposed transversely thereof and serving as a partition, troughs positioned beneath said box and to each side thereof to receive feed, a water trough disposed along one side of said cage, and extending beneath the feed box and positioned in the same horizontal plane as the feed troughs.

2. The combination with a cage, of a feed box disposed transversely thereof and serving as a partition, troughs positioned beneath said box and to each side thereof to receive feed, the troughs being of less length than the width of the cage, and an inclined water trough disposed along one side of the said cage and extending beneath the box and across adjacent end walls of the first-named troughs.

3. The combination with a cage, of a feed box disposed transversely thereof and serving as a partition, troughs positioned beneath said box and to each side thereof to receive feed, the troughs being of less length than the width of the cage, an inclined water trough disposed along one side of the said cage and extending beneath the box and across adjacent end walls of the first-named troughs, means for supplying water to the uppermost end of said trough, and an overflow conduit connected to the lower end thereof, the inclination of the trough being such that a body of water will be retained therein throughout substantially its entire length.

JACOB PETRY.